United States Patent Office 2,774,788
Patented Dec. 18, 1956

2,774,788

PREPARATION OF 2-METHYL-4-CHLORO-PHENOXYACETIC ACID

Alex Hlynsky, Painesville, and John W. Jenney, Madison, Ohio, assignors to Diamond Alkali Company, Cleveland, Ohio, a corporation of Delaware No Drawing. Application February 6, 1953, Serial No. 335,605

4 Claims. (Cl. 260—521)

This invention relates to improvements in the manufacture of organic compounds, and more particularly relates to the manufacture of chlorinated cresoxyacetic acid. Where the expression "chlorinated cresoxyacetic acid" is used herein, it is intended to include, unless expressly distinguished, functional derivatives of that acid, including esters, amides, salts and the like.

Chlorinated cresoxyacetic acid, particularly 2-methyl-4-chlorophenoxyacetic acid, is a known effective hormone-type weed killer having general herbicidal purposes. The material is preferred in some uses over 2, 4-dichlorophenoxyacetic acid (2, 4-D), in particular in applications to cereal crops grown in relatively cool climates. This advantageous property arises both from the effectiveness of 2-methyl-4-chlorophenoxyacetic acid against undesired weeds, such as Canada thistle, white top, and certain species of the mustard family, as well as high toleration by cereal crops to the use of the material, such crops including flax, oats, wheat, barley, rye, and rice. The material, therefore, is clearly established as a useful herbicidal composition of the hormone type and has gone into relatively wide use in formulations for application to such crops.

Various methods have been proposed in the arts for the manufacture of 2-methyl-4-chlorophenoxyacetic acid, it having been particularly proposed to chlorinate cresol and to condense the chlorinated cresol with monochloroacetic acid to obtain a yield of 2-methyl-4-chlorophenoxyacetic acid not much in excess of 65% of the total yield of material obtained, the remaining portion of the yield being the 2-methyl-6-chloroisomer and similar unwanted materials which, though apparently not unduly toxic to cereal crops and the like to which the material is applied, are worthless as weed killers and, thus, amount to inert diluents in the ultimate material. The wastage of upwards of 35–40% of the raw materials applied to the process described makes it uneconomical.

The related 2, 4-dichlorophenoxyacetic acid has been proposed to be synthesized by the condensation of phenol with monochloroacetic acid followed by dichlorination of the condensation product obtained. It has been proposed to accomplish this dichlorination reaction by employing molten phenoxyacetic acid and chlorinating the same under various conditions. This proposal has failed of adoption for the most part since high temperatures of chlorination are required and losses of chlorine and the degradation of the phenoxyacetic acid are necessarily encountered. Moreover, upon chlorination of the phenoxyacetic acid there is a considerable yield of isomers other than the 2,4-isomers which reduce the value of the ultimate product and, thus, amount to a wastage of raw material.

It has also been proposed in connection with the manufacture of 2,4-dichlorophenoxyacetic acid to condense phenol with monochloroacetic acid and to follow this condensation reaction by a dichlorination in stepwise stages in the presence of acetic acid. The process, however, apparently is not susceptible of commercial adoption since the best yield obtained of the desired 2,4-dichlorophenoxyacetic acid product is of the order of 80%.

The present invention has for its object the production of 2-methyl-4-chlorophenoxyacetic acid in substantially 100% active isomer of the entire yield obtained and in high yield based upon the reacting raw materials. The formula for this substance is:

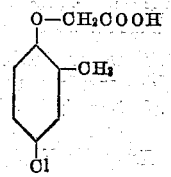

A further object of the invention is to accomplish the chlorination of cresoxyacetic acid in a minimum amount of inexpensive, easily-recoverable recyclable solvent and at modest temperatures which preclude the degradation of the reacting materials or the products thereof and, thus, produce a high yield. Further objects and advantages will appear from the more detailed description of the invention which appears hereinafter.

In accordance with one aspect of the present invention, cresoxyacetic acid is suitably chlorinated at temperatures of the order of 125° C. or less, and suitably at temperatures of the order of 105–110° C., in the presence of a modicum of aliphatic acid having less than 4 carbon atoms, examples of which are formic, acetic, propionic, normal and isobutyric acids. The product of the reaction is readily recovered from the reaction mass and the remaining acid may suitably be washed therefrom with water since the 2-methyl-4-chlorophenoxyacetic acid itself is quite insoluble in water. The reaction is normally performed in the absence of a catalyst, though catalysts such as ferric chloride, antimony chloride, or aluminum chloride may be used. Small amounts of iodine or the like may be employed to inhibit the chlorination of the side chain, if desired, but are not necessary.

The reaction may suitably be performed at ambient pressures, though performance of the reaction under pressure may be practiced if desired.

A particular feature of the invention has to do with the use of insufficient acid as a solvent truly to dissolve the reacting materials, but merely enough to serve as a washing device for the condensing surfaces of the reflux condenser under which the reaction is carried out. When practicing in accordance with this aspect of the invention, a somewhat higher temperature of chlorination is in general preferred.

When performed in accordance with the reaction of the present invention in contact with an aliphatic acid of 4 or less carbon atoms, the reaction runs smoothly to substantially quantitative yield, i. e., of the order of 90 or more percent, the reaction product comprising substantially entirely the 2-methyl-4-chloro isomer of phenoxyacetic acid.

The following examples are offered as illustrative of the specific aspect of the invention, the detailed teachings therein to be taken not as limiting but merely as illustrative:

Example I 83 grams of 2-methyl phenoxyacetic acid are placed in a 3-neck, round-bottom, one-liter flask, fitted with a reflux condenser, stirrer, and chlorine gas disperser, comprising a fritted glass sparger adapted to disperse chlorine substantially at the bottom of the flask. 100 cc. of glacial acetic acid are added and the mixture is heated to 105° C. 39 grams of chlorine are added over a period of 45 minutes. The chlorination temperature is maintained at 105–110° C. The product is cooled, whereupon the solution becomes cloudy at about 51° C. Crystals form at 45° C. The product is further cooled at 20° C. and filtered, the crystals being washed with cold water. The first crop of crystal yield is 86 grams. The filtrate (glacial acetic acid solution) measuring 40 cc. is diluted to 250 cc. in a volumetric flask with water to yield a second crop of crystals.

Analysis of the two products indicates that the first crop of crystals contains 98% 2-methyl-4-chlorophenoxyacetic acid. From the second crop of crystals there is recovered an additional 5.8 grams of 2-methyl-4-chlorophenoxyacetic acid. The overall yield of 2-methyl-4-chlorophenoxyacetic acid is, therefore, 90%.

Following the same procedures employing carbon tetrachloride as a solvent either in the cold or using boiling carbon tetrachloride, yields could not be obtained in excess of 50% of 2-methyl-4-chlorophenoxyacetic acid.

Example II

Employing a glass-lined reactor equipped with a steam jacket, stirrer, thermometer well, and reflux condenser, 100 lbs. of 2-methyl phenoxyacetic acid are placed in the reactor in dry form and 121 lbs. of glacial acetic acid added thereto. Steam is admitted to the jacket to raise the temperature to about 100° C. Chlorine is fed through a sparger in the bottom of the reactor and 47.4 lbs. of re-evaporated liquid chlorine are fed to the reactor over a time of 40 to 45 minutes with the external heating discontinued. The reaction temperature is of the order of 105-110° C. and is maintained below 120° C. by occasional introduction of coolant in the reactor jacket.

On the completion of chlorination, approximately 25% of the remaining acetic acid is removed by distillation. The reaction mass remaining is cooled to 20° C. and the precipitated product filtered off. The filter cake is washed free of residual acetic acid with cold water. 103.5 lbs. of product found to be 98% 2-methyl-4-chloroacetic acid first run crystals are obtained from this run. An additional yield of 6% of 61-71% 2-methyl-4-chlorophenoxyacetic acid is obtained by working up the mother liquor. A yield of 98% purity product is equivalent to 84.2% yield on the chlorination step and an 81.6% yield of 98% 2-methyl-4-chlorophenoxyacetic acid based on orthocresol.

Example III

A 300 ml. round-bottom, 3-neck flask is equipped with a thermometer, a chlorine inlet tube having a fritted glass sparger adapted to release chlorine at the bottom of the flask and a reflux condenser. 92.3 grams of 2-methyl phenoxyacetic acid are placed in the flask and the flask heated with introduction of chlorine to a temperature of 160° C. After chlorine is introduced for a period of about 10 minutes, the temperature rises to 170° C. and white material sublimes from the reactor and appears on the condenser and reaction flask surfaces. 10 mls. of glacial acetic acid are added through the reflux condenser to wash down the sides of the reaction flask and condenser. The reaction continues with gradually decreasing temperature, no further sublimation occurring. After 45 minutes of reaction the temperature has reached 124° C. and the stoichiometric amount of chlorine, i. e., 44 grams, has been introduced. A yield of 111 grams of product is obtained which amounts to a 99% yield based upon raw materials fed. Analysis for 2-methyl-4-chlorophenoxyacetic acid of this product indicates that 86% thereof is the desired isomer.

Example IV

A 300 ml. round-bottom, 3-neck flask is equipped with a thermometer, a chlorine inlet tube having a fritted glass sparger adapted to release chlorine at the bottom of the flask and a distilling trap. 26 grams glacial acetic acid and 83 grams of 2-methyl phenoxyacetic acid are placed in the flask and the flask heated with introduction of chlorine to a temperature of 140° C. At this temperature the glacial acetic acid washes down the side of the reactor, and at the same time a portion of the acetic acid is gradually distilled out and collected in the distilling trap. The reaction continues with no evidence of sublimation occurring. After 38 minutes of reaction, a total of 41 grams of chlorine has been introduced, and 15 grams of the glacial acetic acid has been distilled out and collected for reuse. The product solidifies on cooling and is ground up in the presence of water in order to remove residual acetic acid. The product is collected on a filter and dried. A yield of 98 grams of product is obtained which amounts to a 98% yield based upon the 2-methyl phenoxyacetic acid used. Analysis for 2-methyl-4-chlorophenoxyacetic acid of this product indicates that 87% thereof is the desired isomer.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of synthesizing 2-methyl-4-chlorophenoxyacetic acid which includes the steps of chlorinating cresoxyacetic acid in the presence of an aliphatic acid having less than 4 carbon atoms at a temperature sufficient to preclude crystallization of the product or solidification of said aliphatic acid, and thereafter recovering 2-methyl-4-chlorophenoxyacetic acid therefrom.

2. The method of synthesizing 2-methyl-4-chlorophenoxyacetic acid which includes the steps of chlorinating cresoxyacetic acid in a solution of an aliphatic acid having less than 4 carbon atoms at a temperature sufficient to preclude crystallization of the product or solidification of the solvent and thereafter recovering said 2-methyl-4-chlorophenoxyacetic acid.

3. The method of synthesizing 2-methyl-4-chlorophenoxyacetic acid which includes the steps of chlorinating cresoxyacetic acid in acetic acid at a temperature sufficient to preclude crystallization of the product or solidification of the solvent and thereafter separating the desired 2-methyl-4-chlorophenoxyacetic acid.

4. The mehod of synthesizing 2-methyl-4-chlorophenoxyacetic acid which includes the steps of chlorinating cresoxyacetic acid in glacial acetic acid at a temperature within the range from about 105°-125° C. and thereafter recovering 2-methyl-4-chlorophenoxyacetic acid.

References Cited in the file of this patent

UNITED STATES PATENTS

| 2,471,575 | Manske | May 31, 1949 |

FOREIGN PATENTS

| 573,510 | Great Britain | Nov. 23, 1945 |
| 592,827 | Great Britain | Sept. 30, 1947 |

OTHER REFERENCES

Haskelberg: J. Org. Chem., vol. 12, pp. 426-433 (1947).